UNITED STATES PATENT OFFICE.

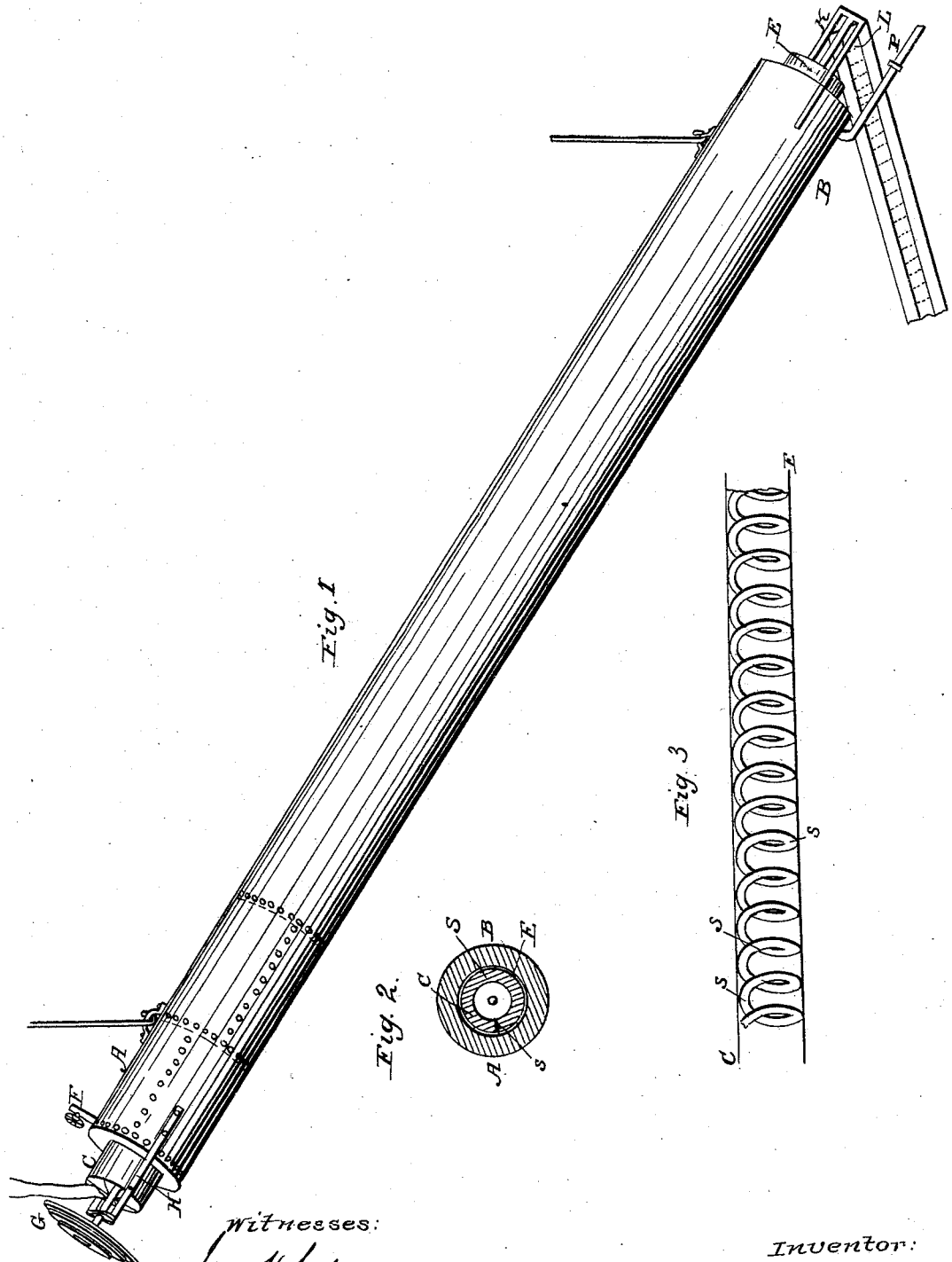

CALEB H. BOOTH, OF DUBUQUE, IOWA.

IMPROVEMENT IN GRAIN-DRIERS.

Specification forming part of Letters Patent No. 41,273, dated January 19, 1864.

*To all whom it may concern:*

Be it known that I, CALEB H. BOOTH, of Dubuque, in the county of Dubuque, in the State of Iowa, have invented a new mode of improving the quality of flour and meal made of cereals, and of preventing the same from becoming damaged or soured when taken into a moist or warm climate; and I do hereby declare that the following is a full and exact description thereof, reference being had to the accompanying drawings, and to the letters of reference marked thereon.

The nature of my invention consists in a machine to cause the flour or meal in its passage from the burrs to the packing-bin, either before or after being bolted, to pass through a heated atmosphere a distance of twelve to eighteen feet, the flour or meal to be passed with greater or less velocity in proportion to the heat of the atmosphere through which it passes, leaving only a sufficient time to bleach it and thoroughly extract the moisture without baking or parching it.

The atmosphere is to be heated by means of a reservoir, A B, in the shape of a small single-flued boiler—diameter, fifteen to eighteen inches; length, twelve to eighteen feet; diameter of flue, nine to twelve inches. This reservoir is to be supplied with steam from a boiler under a pressure of eighty to one hundred pounds on the square inch. The reservoir and pipe conducting steam to same should be jacketed to prevent condensation and radiation of heat. The reservoir is to be placed at an angle of thirty or thirty-five degrees, for the double purpose of facilitating the passage downward of the flour or meal and the passage upward of air to carry off the moisture sought to be extracted. Inside the flue is to be placed a cylinder, C E, of copper, tin, or other metal, about one foot longer than the flue and about half an inch less in diameter, so that it can turn in the flue without rubbing. This cylinder, which is the one through which the flour is to be conveyed, is to have a strip, S, of tin or other metal, one to two inches wide, soldered to it, erect on the inside in a spiral form, with a distance of from eight to twelve inches between the threads. The object of the spiral is to cause the flour or meal in its descent to pass over more of the surface of the cylinder to better expose it to the action of the air and to keep it more evenly distributed throughout the whole length of the cylinder. This cylinder is to be open at the ends and to be fastened on an axis and made to revolve at any required speed by connecting it with the power used in the mill. At the top of the reservoir there should be a stop cock, F, to allow steam to blow through to expedite the heating of the machine when about to commence using it, and one at the bottom to draw off condensed steam; but this last may be omitted if the conducting-pipe P be inclined, so that the condensation can return to the boiler. Driving-pulley G is at top of axis. Supports H and I are at top end of reservoir for box of axis, and K and L at bottom for socket for pivot end of axis.

What I claim as my invention, and desire to secure by Letters Patent, is—

The combination of the conveyer C E with the steam-heated reservoir A B inclosing it, all constructed substantially as shown, and by means thereof with steam to bleach, to purify, and to dry flour and meal, but no other substance.

CALEB H. BOOTH.

Witnesses:
JNO. H. LAW,
GEO. D. LAWRENCE.